United States Patent [19]

Inamori

[11] Patent Number: 5,793,437
[45] Date of Patent: Aug. 11, 1998

[54] SYNCHRONIZING SIGNAL GENERATING CIRCUIT AND APPARATUS FOR CREATING STILL-PICTURE

[75] Inventor: Shinri Inamori, Yokohama, Japan

[73] Assignee: Texas Instruments Incorporated, Dallas, Tex.

[21] Appl. No.: 535,304

[22] Filed: Sep. 27, 1995

[30] Foreign Application Priority Data

Sep. 27, 1994 [JP] Japan ................... 6-231592

[51] Int. Cl.⁶ .................................. H04N 5/06
[52] U.S. Cl. ................... 348/559; 348/524; 348/537
[58] Field of Search ............................ 348/559, 524, 348/523, 536, 537, 538; H04N 5/44, 5/06

[56] References Cited

U.S. PATENT DOCUMENTS

| | | | |
|---|---|---|---|
| 4,517,587 | 5/1985 | Aizawa | 348/524 |
| 4,958,228 | 9/1990 | Kutsuki | 348/537 |
| 5,148,276 | 9/1992 | Furumiya | 348/524 |

*Primary Examiner*—Sherrie Hsia
*Attorney, Agent, or Firm*—Richard L. Donaldson; William B. Kempler

[57] ABSTRACT

A synchronizing signal creating circuit which can feed stable synchronizing signals even after input signals stop. it is constituted of gate circuit 804 makes signal (G) into logic level 1 and outputs to switching circuit 818 when the still picture creating apparatus which executes processing with the synchronizing signals created by synchronizing signal creating circuit 80 executes creation or output of still pictures, and when frame synchronizing signal (IFP) and the frame pulse do not synchronize. Switching circuit 818 selects contact point b and outputs numerical value ($V_{DC}$) to digital/analog converting circuit 816 so the operation of PLL loop stops. Consequently, in this case, voltage control oscillating circuit 820 creates signals (HCK) with a frequency corresponding to numerical value ($V_{DC}$) and in other cases, creates signals (HCK) with a frequency determined by the operation of the PLL loop.

2 Claims, 4 Drawing Sheets

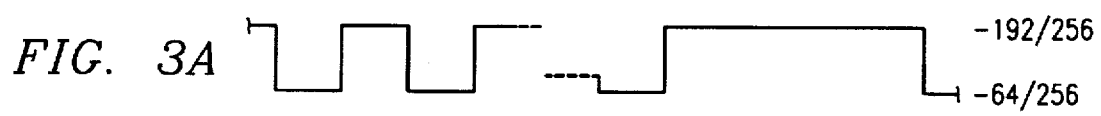
FIG. 3A
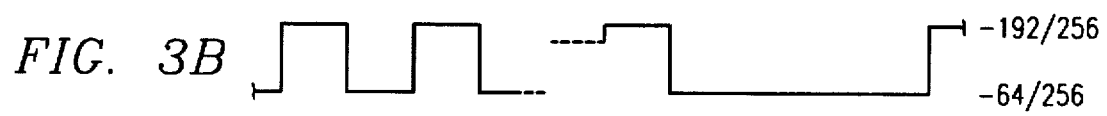
FIG. 3B
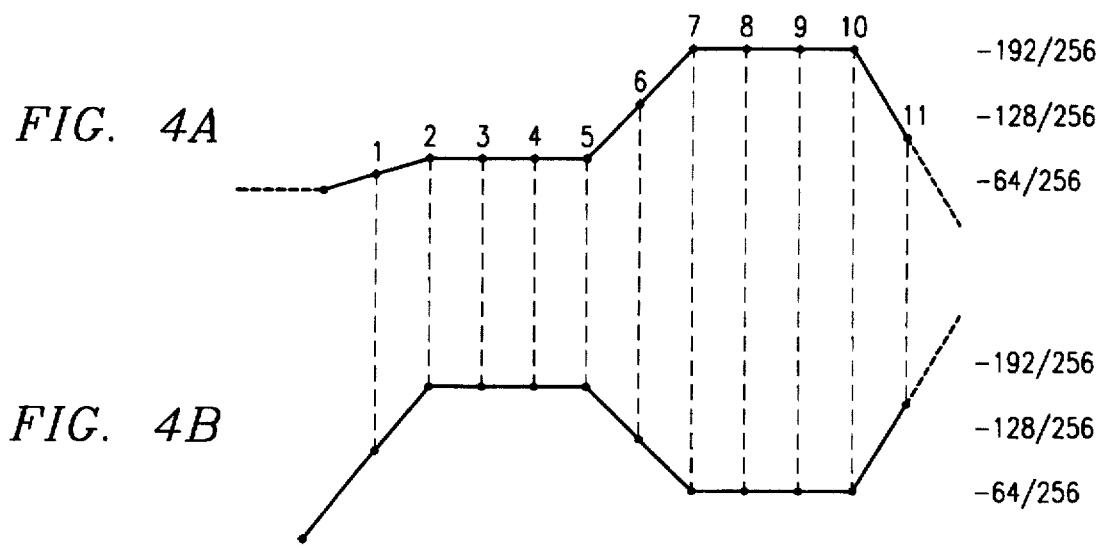
FIG. 4A
FIG. 4B

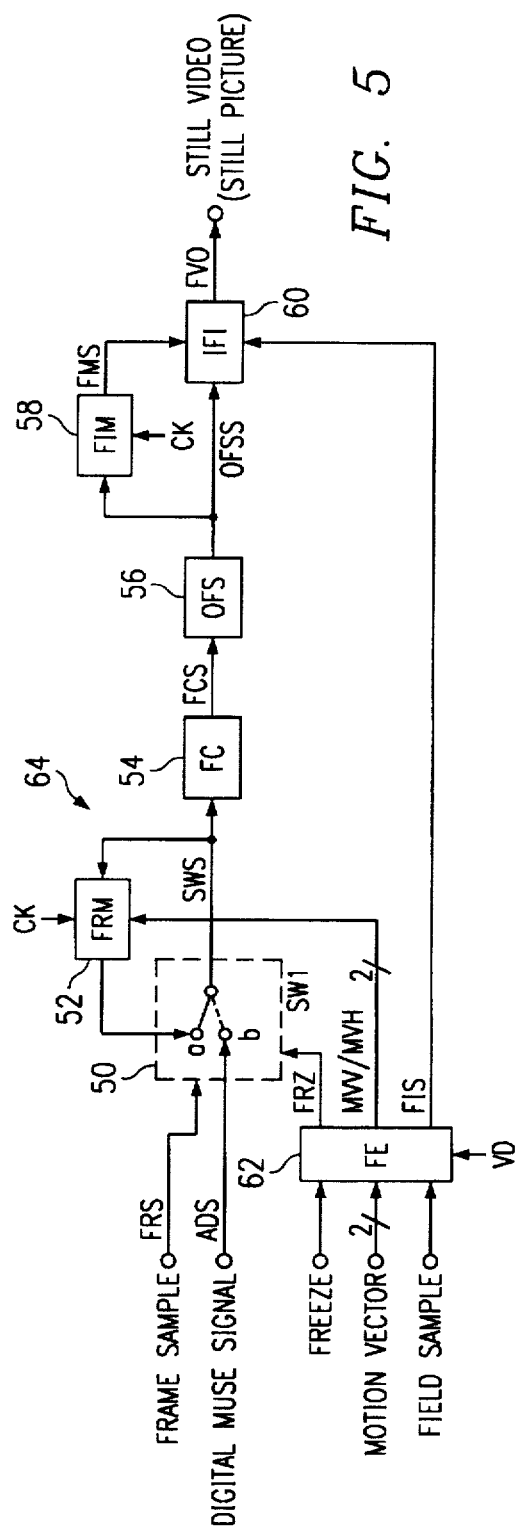
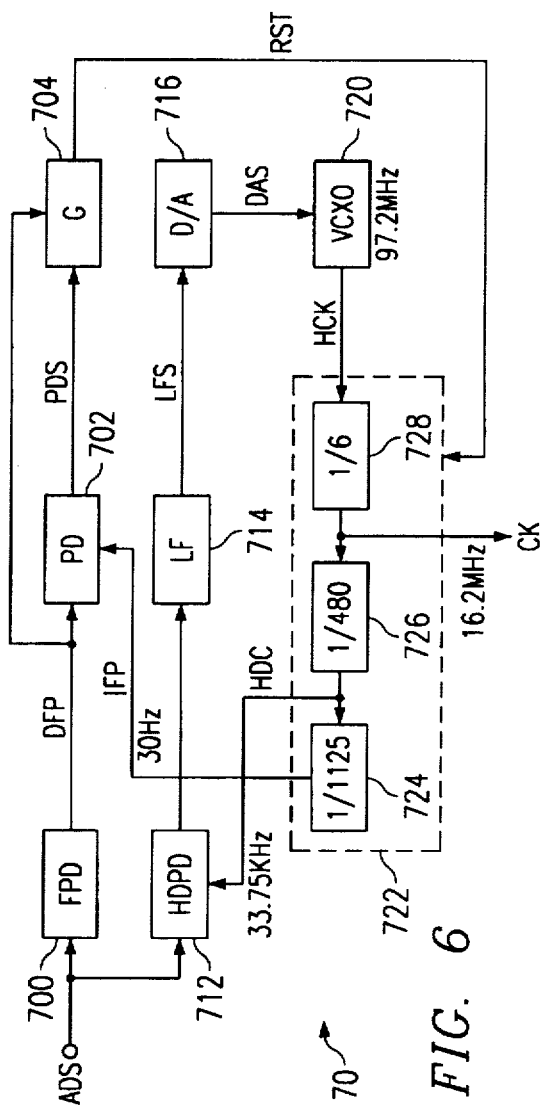

SYNCHRONIZING SIGNAL GENERATING CIRCUIT AND APPARATUS FOR CREATING STILL-PICTURE

FIELD OF INVENTION

The present invention pertains to a synchronizing signal generating circuit for generating synchronizing signals used in the process of creating still pictures from video signals, such as MUSE signals, etc., and a still picture creating apparatus for MUSE signals using the synchronizing signal generating circuit.

BACKGROUND OF THE INVENTION

Presently, a high definition television (HDTV) system is being commercialized in satellite broadcasting, etc. When broadcasting video signals of the HDTV system, the video signals are first band-compressed by the MUSE system and then transmitted.

In the MUSE system, the video signals are sampled by applying offset to the sampling phase between the fields, between the frames, and between the lines and creating band compressed signals (hereinafter referred to as "MUSE signals") used in broadcasting as disclosed, for example, in "MUSE High Vision Transmission System (Yuichi Ninomiya, Journal of the Electronic Information Communication Society, Dec. 1, 1990)" (Reference 1).

In the MUSE signals, one frame contains two field signals so the sampling phase is concluded in two frame cycles, namely, four field cycles. Therefore, in an apparatus (hereinafter referred to as "MUSE decoder") which synthesizes HDTV system video signals by band elongating MUSE signals, four continuous field signals are stored and HDTV system video signals are synthesized using the four field signals.

A MUSE decoder has a picture memory with a capacity capable of storing four fields worth of data in which the sampling phase is concluded, and can restore still pictures using the data stored in the picture memory. Namely, by circulating four fields worth of data in an interframe interpolation loop to be discussed later and a still picture of one screen worth can be created and be held. The operation of the MUSE decoder for creating and holds a still picture of one screen from MUSE signals is generally called the freeze frame operation of MUSE decoder.

However, if the input of new MUSE signals is stopped when the MUSE decoder is executing freeze frame operation, there is a problem in which the still picture obtained by the freeze frame operation of the MUSE decoder is poor.

The reason will be explained below. MUSE signals after a still picture is obtained by the freeze frame operation become unnecessary until the freeze frame operation is cancelled. However, the frame synchronizing signals used to display the still picture on the screen and the clock signals (line clock pulse) synchronized with the HD region signals of the MUSE signals are created by synchronizing respectively with the frame pulse of the MUSE signals and the line pulse of the HD region even after a still picture is obtained. Consequently, when MUSE signals are not input while the MUSE decoder is displaying a still picture on the screen, the MUSE decoder cannot create frame synchronizing signals and a line clock pulse of suitable timing; thus, the screen is poor.

The present invention was made taking the problems in the conventional technology into consideration, and aims to provide a still picture creating apparatus and a synchronizing signal generating circuit, for creating synchronizing signals used in the still picture creation process for creating still pictures from MUSE signals, and can feed stable synchronizing signals with respect to the still picture creating process even when obstacles, such as input of MUSE signals ceases, etc., are generated.

Also, the present invention aims to provide a still picture creating apparatus and a synchronizing signal generating circuit which does not prevent display of the created still picture even when the obstacles are generated.

SUMMARY OF INVENTION

In order to achieve the objective, the synchronizing signal generating circuit of the present invention generates clock signals used in the process of creating still pictures from MUSE signals, and has a phase comparing circuit for comparing the phases of the generated line clock pulse and the line pulse of the MUSE signals, a filter circuit for filtering the compared results of the phases by the phase comparing circuit, a switching circuit for selecting the filtering output of the filtering circuit when the process of creating the still picture is not being executed and selects and outputs a fixed voltage when the process of creating the still pictures is being executed, a voltage-controlled oscillator for creating a source clock pulse of a frequency corresponding to the voltage of the output from the switching circuit, a first frequency dividing circuit for frequency dividing the source clock pulse generated by the voltage-controlled oscillator by counting only a prescribed frequency worth and generates the line clock pulse corresponding to the line pulse, a second frequency dividing circuit for frequency dividing the source clock pulse generated by the voltage-controlled oscillator by only a prescribed cycle and generates a frame clock pulse corresponding to the frame pulse of the MUSE signals, and an initializing means for initializing the count value of the first frequency dividing circuit and the second frequency dividing circuit when the phases of the frame clock pulse generated by the second frequency dividing circuit the frame pulses of the MUSE signal deviate only when the process for creating the still pictures is being executed.

It is a still picture creating apparatus for creating still pictures from MUSE signals and has a control voltage generating circuit for comparing the phases of the generated line clock pulse and the line pulse of the MUSE signals and generates control voltage by filtering the comparison result, a switching circuit for selecting the filtering output of the filtering circuit when the process of creating the still pictures is not being executed and switches and outputs a fixed voltage when the process of creating the still pictures is being executed, a frequency dividing circuit for generating source a clock pulse of a frequency corresponding to the voltage of the output from the switching circuit, frequency divides by counting the source clock pulse by only a prescribed frequency worth, and generates a frame clock pulse corresponding to the frame pulse of the MUSE signal and the line clock pulse corresponding to the line pulse, an initializing means for initializing the count value of the frequency dividing circuit when the phase of the frame clock pulse generated by the frequency dividing circuit and the frame pulse of the MUSE signals deviate only during the time the process for creating the still pictures is being executed, a memory circuit which delays the input signals by one frame of the MUSE signals, an interframe interpolating circuit which executes the interframe interpolation process by synchronizing with the line pulses and the frame pulses and alternately storing the MUSE signals and the MUSE signals output one frame previously from the memory circuit into the memory circuit, and a picture processing circuit for interfield interpolating by elongating the MUSE signal which was interframe interpolated by the interframe interpolation processing means.

The phase comparing circuit phase compares the line pulse contained in the HD period of MUSE signals and line clock pulse generated by the first frequency dividing circuit as discussed below which corresponds to the line pulse.

The filtering circuit extracts the components below a prescribed frequency from the signals output as a result of the phase comparison in phase comparing circuit.

The switching circuit selects and outputs the filtering output of the filtering circuit when the process (freeze frame operation) for creating a still picture from the MUSE signals is not being executed and selects and outputs a fixed voltage when the freeze frame operation is being executed.

The voltage-controlled oscillator generates a source clock pulse with a frequency of, for example, 97.2 MHz corresponding to the voltage of the output signals of the switching circuit.

The first frequency dividing circuit creates a line clock pulse of 33.75 kHz by dividing the present clock pulse into a frequency of 1/2880.

The second frequency dividing circuit creates a frame clock pulse of 30 Hz by further dividing the frame clock pulse into a frequency of 1/1125.

The phase comparing circuit, filtering circuit, voltage-controlled oscillator, and first frequency dividing circuit explained above execute PLL operation while the freeze frame operation is not being executed and feeds a frame clock pulse and line clock pulse synchronized with the MUSE signals to the circuit which executes the freeze frame operation. On the other hand, when the freeze frame operation is not being executed, the PLL operation is stopped and reproduces a line clock pulse and frame clock pulse from the source clock pulse pulses with a frequency corresponding to a fixed voltage.

The initializing means detects the phase deviation of the frame clock pulse and the frame pulse of the MUSE signals only during the freeze frame operation is being executed and frame synchronizes by initializing the count value of the first frequency dividing circuit and second frequency dividing circuit when deviation occurs. The initalizing means does not execute initialization with respect to the first frequency dividing circuit and the second frequency dividing circuit when the freeze frame operation is being executed.

BRIEF DESCRIPTION OF THE DRAWINGS

FIGS. 3(A)–3(B) show the waveforms of the frame pulse of the MUSE signal. FIG. 3(A) shows the waveform of frame pulse #1 shown in FIG. 2, and FIG. 3(B) shows the waveform of frame pulse #2 shown in FIG. 2.

FIGS. 4(A)–4(B) shows the waveforms of the synchronization pattern (line pulse) in the HD period of MUSE signal. FIG. 4(A) shows the synchronization pattern waveform of lines n, and FIG. 4(B) shows the synchronization pattern waveform of line n+1.

FIG. 5 shows the constitution of a still picture creating apparatus for creating still pictures from MUSE signals in the video processing circuit shown in FIG. 1.

FIG. 6 shows the constitution of the synchronizing signal generating circuit of the present invention in the first embodiment.

Figure 1:
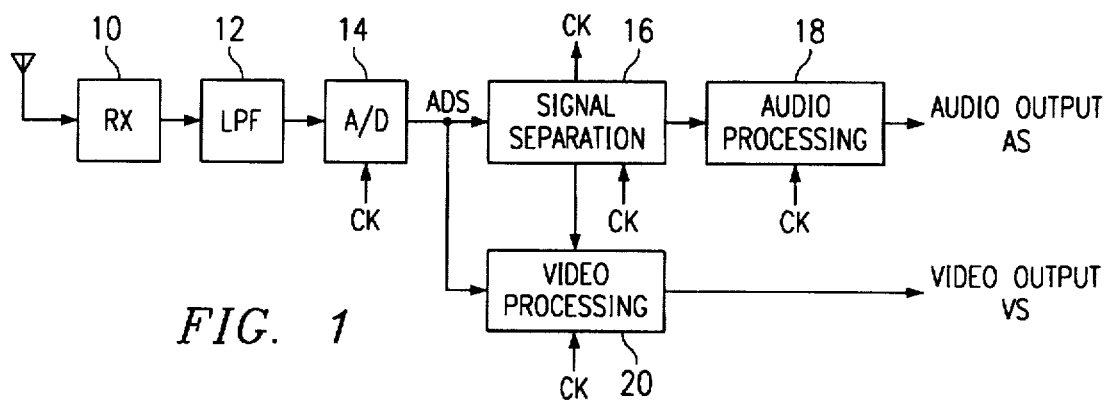
FIG. 1 is a block diagram of the MUSE decoder used by the synchronizing signal generating circuit of the present invention.

The figures also illustrate a MUSE decoder 1, a receiving circuit 10, a low-pass filter 12, an analog/digital converting circuit 14, a signal separating circuit 16, an audio processing circuit 18, (20) . . . a video processing circuit 20, a still picture creating apparatus 5, a switch 50, a frame memory 52, a frequency converting circuit 54, an offset subsampling circuit 56, a field memory 58, an interfield interpolation circuit 60, a freeze encoder 62, an interframe interpolation loop 64, synchronizing signal generating circuits 70 & 80, frame pulse detecting circuits 700 & 800, synchronization detecting circuits 702 & 802, (704), gate circuits 704 & 804, logic circuits 842, 844 & 846, line pulse detecting circuits 712 & 812, loop filters 714 & 814, digital/analog converting circuits 716 & 816, switching circuit 818, voltage-controlled oscillators 720 & 820, synchronizing signal generating circuits 722 & 822, (724), (726), (728), (824), and frequency dividing circuits 724, 726, 728, 824, 826, 828.

DESCRIPTION OF THE EMBODIMENTS

Embodiment 1

Below, the first embodiment of the present invention will be explained with reference to FIGS. 1–6. FIG. 1 shows the constitution of MUSE decoder 1 which uses synchronizing signal generating circuit 70 of the present invention in the first embodiment.

As shown in FIG. 1, MUSE decoder 1 is a device which outputs video output (VS) and audio output (AS) by receiving the video signals (hereinafter referred to simply as "MUSE signals") which were transmitted from broadcasting satellite (BS) as a broadcast wave by the video signals of high-definition television (HDTV) being band compressed by the MUSE system and executing band elongation of the video signals and demodulation of the audio signals, and is comprised of receiving circuit (RX) 10, low-pass filter (LFP) 12, analog/digital converting circuit (A/D) 14, signal separating circuit 16, audio processing circuit 18, and video processing circuit 20.

Receiving circuit 10 receives and processes the broadcast wave and takes out MUSE signals and outputs it to low-pass filter 12.

Low-pass filter 12 outputs it to analog/digital converting circuit 14 by allowing only signal components of 8.1 MHz or less in the MUSE signals input from receiving circuit 10 to pass.

Analog/digital converting circuit 14 samples the MUSE signals input from low-pass filter 12 with 16.2 MHz, converts into MUSE signals of 8-bit digital format, and outputs them as digital MUSE signals (ADS) to signal separating circuit 16 and video processing circuit 20.

Signal separating circuit 16 creates clock signals (CK) of 16.2 MHz, etc., from digital MUSE signals (ADS) input from analog/digital converting circuit 14, feeds them to each circuit of MUSE decoder 1, and along with synchronizing the frame of MUSE decoder 1 and digital MUSE signal (ADS) by detecting the frame pulse to be discussed later with reference to FIG. 2, the audio signals and motion vector are separated from digital MUSE signal (ADS) then output respectively to audio processing circuit 18 and video processing circuit 20.

Audio processing circuit 18 outputs audio output (AS) by processing the audio signals input from signal separating circuit 16.

Video processing circuit 20 has still picture creating apparatus 5 (refer to FIG. 5) and moving picture creating apparatus, creates still pictures and moving pictures by band elongating the MUSE signals from digital MUSE signals (ADS) and moving the vector input from signal separating circuit 16, and outputs one of the two as video output signals VS). Still picture creating apparatus 5 will be discussed later with reference to FIG. 5.

Video output (VS) is displayed on CRT display (not shown in the figure), etc.

Still picture creating apparatus 5 is used to create still pictures from MUSE signals in video processing circuit 20. Also, synchronizing signal generating circuit 70 in the present invention is used to create clock signals (CK), frame synchronizing signals (IFP), and line clock pulse (HDC) in signal separating circuit 16. Synchronizing signal generating circuit 70 will be discussed later with reference to FIG. 6.

Below, the constitution of the MUSE signal, frame pulse, and line pulse, etc., will be explained with reference to FIGS. 2–4(B).

Figure 2:
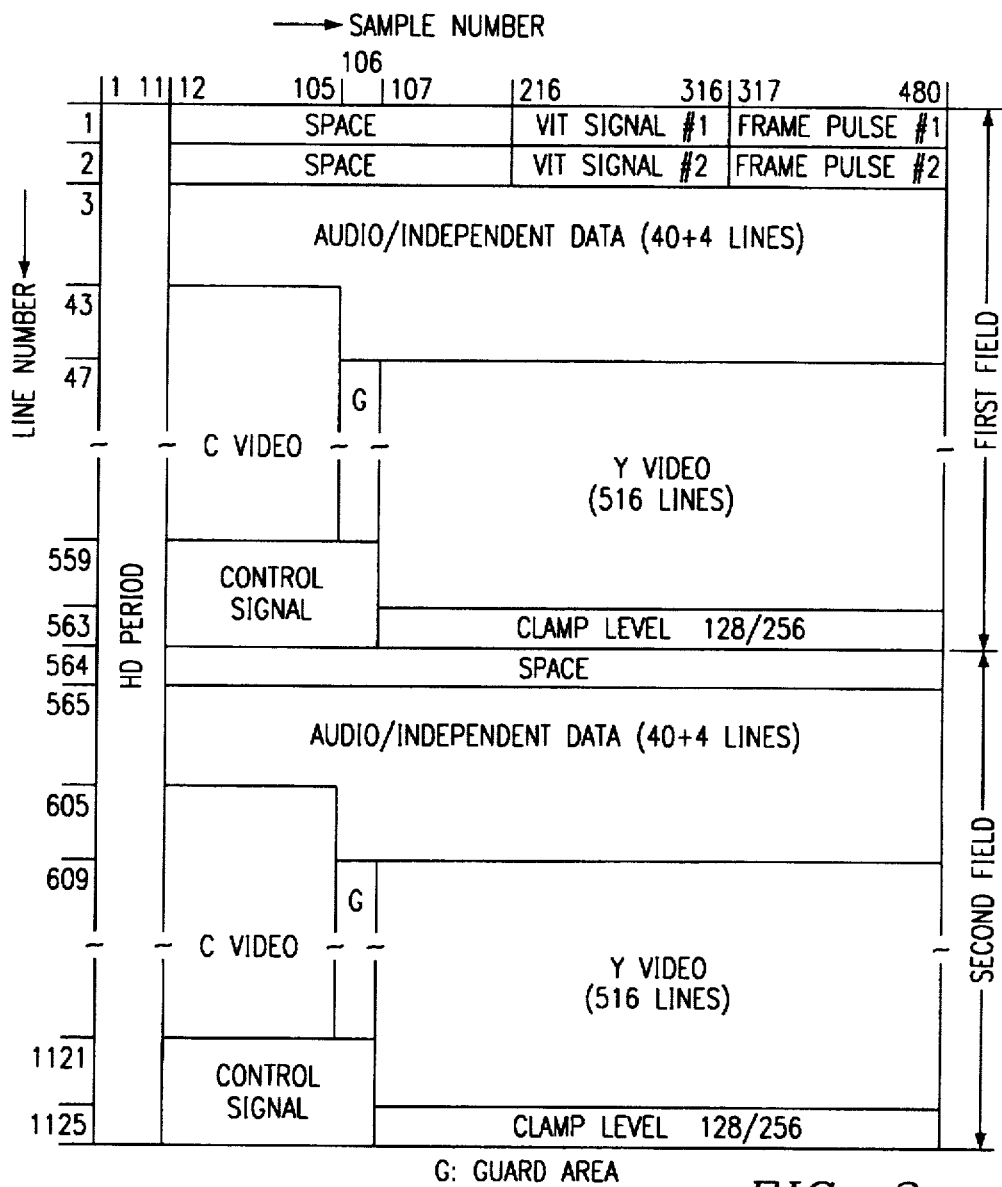
FIG. 2 shows the frame construction of the MUSE signal.

FIG. 2 is a figure showing the frame constitution of MUSE signal.

The frame constitution of the MUSE signal has the constitution shown in FIG. 2 and video signal of MUSE signal 1 frame is composed of two fields including the first field and second field as disclosed in, for example, "MUSE High Vision Transmission System (Yuichi Ninomiya, Dec. 1, 1990, Journal of The Electronic Information Communication Society)) (Reference 1), page 45.

Frame pulse is in the position of sample No. 317 to sample No. 480 in first and second lines of the MUSE signal and the line pulse is in the position (HD period) of sample No. 1 and sample No. 11 in each line of the MUSE signal.

Below, the frame pulse of the MUSE signal and the detection method will be explained with reference to FIGS. 3(A)–3(B).

FIGS. 3(A)–3(B) are figures showing the waveforms of the frame pulse of the MUSE signal, FIG. 3(A) shows the waveform of frame pulse #1 shown in FIG. 2, and FIG. 3(B) shows the waveform of frame pulse #2 shown in FIG. 2.

Frame pulses #1 and #2 shown in FIG. 2 are signal patterns in which high level of the waveform becomes ¾=(192/256) and the low level of the waveform becomes ¼=(64/256) in digital MUSE signal (ADS) converted into the digital format as shown in FIGS. 3(A) and 3(B), and the levels of the waveform at the corresponding position in the first line and second line are inverted.

Therefore, by identifying digital MUSE signal (ADS) as logic level 1 when exceeds the threshold value and as logic level 0 when it is less than the threshold value with the threshold value as, for example, ½=(128/256) and when the exclusive logical sum of the logic level in the identification result one line before is obtained, the part corresponding to the frame pulse becomes logic level 1 continuously during 164 samples (164 cycles in clock signal (CK) of 16.2 MHz) from sample No. 317 to sample No. 648. By finding the part which satisfies the condition within the MUSE signal, detection of the frame pulse can be executed reliably and easily.

Below, the waveform of the line pulse will be explained with reference to FIGS. 4(A)–4(B).

FIGS. 4(A)–4(B) show the waveforms of the synchronization pattern (line pulse) in the HD period of MUSE signal, FIG. 4(A) shows the waveform of the synchronization pattern in line n, and FIG. 4(B) shows the waveform of the synchronization pattern in line n+1.

Line pulses with the waveforms shown in FIGS. 4(A) and 4(B) are alternately in the HD region in each line of the MUSE signal shown in FIG. 2, and by detecting the line pulses, it is possible to detect the HD reference point used to specify the HD region of the MUSE signal.

The frame pulse of digital MUSE signal (ADS) which was received by receiving circuit 10 shown in FIG. 1, filtered by low-pass filter 12, and converted into a signal of 8-bit digital format by analog/digital converting circuit 14) is input into signal separating circuit 16 of MUSE decoder 1 as frame pulse #1 in sample No. 317 to sample No. 480 in the first line and frame pulse #2 in sample No. 317 to sample No. 480 in the second line shown in FIG. 2.

Below, the constitution and operation of still picture creating apparatus 5 will be explained with reference to FIG. 5.

FIG. 5 shows the constitution of still picture creating apparatus 5 for creating still pictures from MUSE signals in video processing circuit 20 shown in FIG. 1.

As shown in FIG. 5, still picture creating apparatus 5 is comprised of switch 50, frame memory 52, frequency converting circuit 54, offset subsampling circuit 56, field memory 58, interfield interpolating circuit 60, and freeze encoder 62.

Below, the operation of still picture creating apparatus 5 will be explained.

The MUSE signals converted into digital format signals by analog/digital converting circuit 14 shown in FIG. 1 are input into interframe interpolating circuit 64 of still picture creating apparatus 5 as digital MUSE signals (ADS).

Switch 50 of interframe interpolating loop 64 selects contact point (a) when freeze indication signal (FRZ) is at logic level 0 indicating that freeze frame operation is not executed and frame sample signal (FRS) is at logic level 1, and selects contact point (b) when frame sample signal (FRS) is at logic level 0. As a result, interframe interpolation loop 64 multiplexes digital MUSE signal (ADS) of the pertinent frame and the data output by frame memory 52 by providing a delay of one frame.

On the other hand, when freeze indication signal (FRZ) is at logic level 1 indicating freeze frame operation, contact point (a) is always selected and circulates the data stored on frame memory 52 in interframe interpolation loop 64 at the point in time that freeze indication signal (FRZ) becomes logic level 1 indicating freeze frame operation.

Frame memory 52 of interframe interpolation loop 64 stores the data input as switch output signal (SWS) every time the logic level of frame sample signal (FRS) changes, executes a movement compensation process based on the motion vector input from signal separating circuit 16 shown in FIG. 1, and outputs to terminal (a) of switch 50 by providing a delay of one frame.

Interframe interpolation loop 64 executes the interframe interpolation process when freeze indication signal (FRZ) is at logic level 0, and outputs it to frequency converting circuit 54 as switch output signal (SWS).

Frequency converting circuit 54 filters switch output signal (SWS) input from interframe interpolation loop 64, converts it into filtering signal (FCS) of 48.6 MHz, and outputs it to offset subsampling circuit 56.

Offset subsampling circuit 56 converts filtering signal (FCS) input from frequency converting circuit 54 into signal (OFSS) of 24.3 MHz, and outputs it to interfield interpolation circuit 60 and field memory 58.

Field memory 58 provides a delay of one field worth to filtering signal (FCS) and outputs to interfield interpolation circuit 60 as signal (FMS).

Interfield interpolation circuit 60 executes the interfield interpolation process using field sampling signal (FIS) and signal (FMS) input from field memory 58, and outputs by creating still picture signal (FVO).

Below, the constitution and operation of synchronizing signal generating circuit 70 of the present invention will be explained with reference to FIG. 6.

FIG. 6 is a figure showing the constitution of synchronizing signal generating circuit 70 of the present invention in the first embodiment.

As shown in FIG. 6, synchronizing signal generating circuit 70 is constituted as synchronizing signal generating circuit 722 composed of field pulse detecting circuit (FPD) 700, synchronization detecting circuit (PD) 702, gate circuit (G) 704, line pulse detecting circuit (HDPD) 712, loop filter (LF) 714, digital/analog converting circuit (D/A) 716, voltage-controlled oscillator (VCXO) 720, and phase synchronizing circuit (PLL) having frequency dividing circuits 724, 726, and 728.

Below, the operation of synchronizing signal generating circuit 70 will be explained.

Digital MUSE signals (ADS) converted into digital MUSE signals (ADS) of digital format in analog/digital converting circuit 14 are input into frame pulse detecting circuit 700 and line pulse detecting circuit 712.

Frame pulse detecting circuit 700 detects the frame pulse shown in FIGS. 2 and 3 from digital MUSE signal (ADS) and outputs them to phase comparing circuit 702 and gate circuit 704 by making detection frame pulse signal (DFP) into logic level 1 at the timing the frame pulse was detected.

Synchronization detecting circuit 702 compares, for example, the phases of detection frame pulse signal (DFP) and frame synchronizing signal (IFP) created in synchronizing signal generating circuit 722, detects the deviation in the synchronization when the frame cycle in which the phase difference of frame synchronizing signal (IFP) and (DFP) exceeds a prescribed value for a prescribed frequency, and outputs it to gate circuit 704 by making signal (PDS) into logic level 1.

Gate circuit 704 makes reset pulse (signal RST) for initializing synchronizing signal generating circuit 722 into logic level 1 when signal (PDS) is at logic level 0 and detection frame pulse signal (DFP) is logic level 1 then outputs it to synchronizing signal generating circuit 722. By this operation, the count value of synchronizing signal generating circuit 722 is initialized (cleared) and the phase of the line clock pulse and frame synchronizing signal are coordinated with the phase of the frame pulse.

Line pulse detecting circuit 712 detects the line pulse in the HD period of digital MUSE signal (ADS) shown in FIGS. 2 and 4, detects the phase difference in the line pulse and line clock pulse (HDC) created in synchronizing signal generating circuit 722, and outputs digital format signals corresponding to the value of the detected phase difference to loop filter 714.

Loop filter 714 is constituted from, for example, a circuit which executed integration by numerical methods, filters the digital format signal indicating the phase difference input from line pulse detecting circuit 712, and outputs to digital/analog converting circuit 716 as signal (LFS) with a value corresponding to the phase difference of the signals.

Digital/analog converting circuit 716 converts signal (LFS) into a voltage signal of analog format and outputs it to voltage-controlled oscillator 720.

Voltage-controlled oscillator 720 oscillates at a frequency complying with the applied voltage and as a representative, clock pulse (HCK) of, for example, 97.6 MHz is created and output to synchronizing signal generating circuit 722.

Frequency dividing circuit 728 of synchronizing signal generating circuit 722 creates clock signal (CK) of 16.2 MHz by dividing clock pulse (HCK) into 1/6 and outputs it to each constitutional element of MUSE decoder 1.

Frequency dividing circuit 726 creates line clock pulse (HDC) by dividing clock signal (CK) into 1/480 and outputs to each constitutional element of MUSE decoder 1 and frequency dividing circuit 724.

Frequency dividing circuit 724 creates frame synchronizing signal (IFP) by dividing line clock pulse (HDC) into 1/1125 and outputs it to each constitutional element of MUSE decoder 1 and synchronization detecting circuit 702.

In each circuit of frequency dividing circuits 724, 726, and 728, the count value is initialized (cleared) when signal (RST) becomes logic level 1, and clock signal (CK), line clock pulse (HDC), and frame synchronizing signal (IFP) are synchronized to the frame pulse of the MUSE signals shown in FIGS. 2 and 3.

By the operation of each constitutional elements in synchronizing signal generating circuit 70, clock signal (CK), line clock pulse (HDC), and frame synchronizing signal (IFP) synchronized to the frame pulse and line pulse are created.

In MUSE decoder 1) shown in FIG. 1, clock signal (CK) created by synchronizing signal generating circuit 70 as a signal for regulating the conversion timing of analog/digital converting circuit 14 is used.

Also, the signal used in still picture creating apparatus 5 shown in FIG. 5 is created from frame synchronizing signal (IFP), line clock pulse (HDC), and clock signal (CK). Also, frame synchronizing signal (IFP) and line clock pulse (HDC) are output to the display (not shown in FIG. 1) along with video output signal (VS) of MUSE decoder 1 and used for display processing of the picture.

Embodiment 2

Below, the second embodiment of the present invention will be explained with reference to FIG. 7.

Synchronizing signal generating circuit 80 of the present invention explained in the second embodiment is that which improved synchronizing signal generating circuit 70 shown in FIG. 6 in the first embodiment and is used by replacing synchronizing signal generating circuit 70 in signal separating circuit 16 of MUSE decoder 1 shown in FIG. 1.

When synchronizing signal generating circuit 70 is used in signal separating circuit 16 of MUSE decoder 1, there is the following problem. Namely, obstacles are generated such as MUSE signals not being input into MUSE decoder 1 while still pictures are being output continuously as signals (FVO) after still picture creating apparatus 5 creates still pictures in video processing circuit 20. When this type of obstacle is generated, line pulse and frame pulse of the MUSE signals are not input into synchronizing signal generating circuit 70. Therefore, synchronizing signal generating circuit 70 cannot create stabilized frame synchronizing signal (IFP), line clock pulse (HDC), and clock signal (CK).

If the signals become unstable, the operation of each constitutional element, such as still picture creating apparatus 5, etc., in MUSE decoder 1 becomes unstable regardless of not needing to input MUSE signals into MUSE decoder 1 when the creation of still pictures is completed and need only to continue outputting the still picture, and the operation of the display which displays and processes the still picture created by still picture creating apparatus 5 also becomes unstable.

By using synchronizing signal generating circuit 80 in signal separating circuit 16 instead of synchronizing signal generating circuit 70, the problem could be solved.

Below, the constitution and operation of synchronizing signal generating circuit 80 will be explained with reference to FIG. 7.

Figure 7:
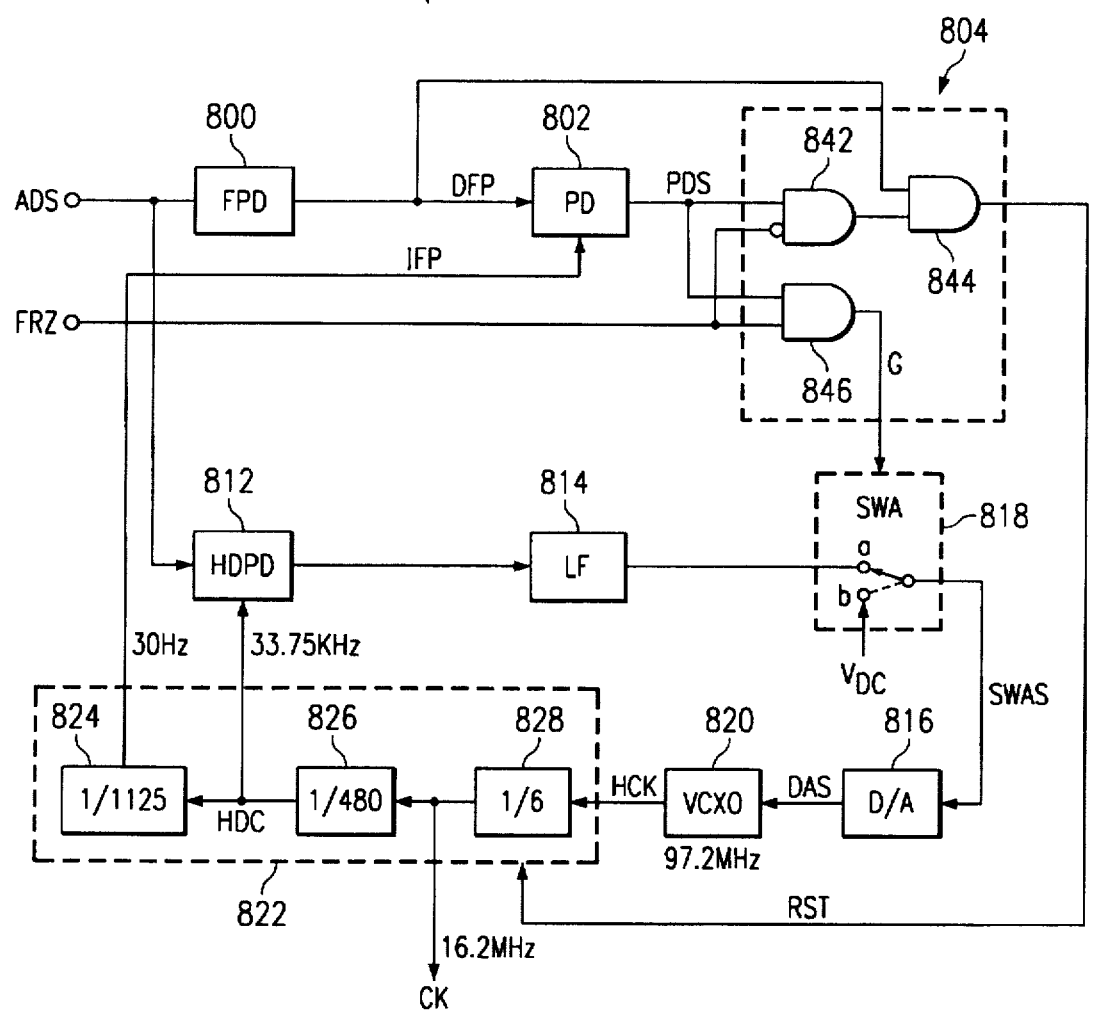
FIG. 7 shows the synchronizing signal generating circuit of the present invention in the second embodiment.

FIG. 7 shows the constitution of synchronizing signal generating circuit 80 of the present invention in the second embodiment.

As shown in FIG. 7, synchronizing signal generating circuit 80 is constituted as synchronizing signal generating circuit 822 composed of frame pulse detecting circuit 800, synchronization detecting circuit 802, gate circuit 804 having logic circuits 842, 844, and 846, line pulse detecting circuit 812, loop filter 814, switching circuit (SWA) 818, digital/analog converting circuit 816, voltage-controlled oscillator 820, and phase synchronizing circuit (PLL) having frequency dividing circuits 824, 826, and 828.

In FIG. 7, logic circuit 842 of gate circuit 804 outputs the logical product of signal (PDS) and the signal which inverted the logic level of freeze indication signal (FRZ) which becomes logic level 1 when creating still picture with respect to still picture creating apparatus 5 shown in FIG. 5 in the first embodiment to logic circuit 844.

Logic circuit 844 outputs the logical product of detection frame pulse signal (DFP) and the output signal of logic circuit 842 to synchronizing signal generating circuit 822 as signal (RST).

Logic circuit 846 outputs the logical product of freeze indication signal (FRZ) and signal (PDS) to switching circuit 818 as signal (G).

Switching circuit 818 selects contact point (a) when signal (G) is at logic level 0 and outputs the output signal of loop filter 814 to digital/analog converting circuit 816, selects contact point (b) when signal (G) is at logic level 1, and outputs a prescribed numerical value ($V_{DC}$) to digital/analog converting circuit 816.

Frame pulse detecting circuit 800, synchronization detecting circuit 802, line pulse detecting circuit 812, loop filter 814, digital/analog converting circuit 816, voltage-controlled oscillator 820, and synchronizing signal generating circuit 822 having frequency dividing circuits 824, 826, and 828 within the constitutional elements of synchronizing signal generating circuit 80 are essentially the same respectively to frame pulse detecting circuit 700, synchronization detecting circuit 702, line pulse detecting circuit 712, loop filter 714, digital/analog converting circuit 716, voltage-controlled oscillator 720, and synchronizing signal generating circuit 722 having frequency dividing circuits 724, 726, and 728 of synchronizing signal generating circuit 70 shown in FIG. 6 in the first embodiment.

Below, the operation of synchronizing signal generating circuit 80 will be explained with reference to FIG. 7.

MUSE signals converted into digital MUSE signals (ADS) of digital form in analog/digital converting circuit 14 are input into frame pulse detecting circuit 800 and line pulse detecting circuit 812 of synchronizing signal generating circuit 80.

Frame pulse detecting circuit 800 executes the same operation of frame pulse detecting circuit 700 in synchronizing signal generating circuit 70.

Synchronization detecting circuit 802 executes the same operation as synchronization detecting circuit 702 in synchronization clock generating circuit.

Gate circuit 804 outputs signal (G) to switching circuit 818 by making it logic level 1 when signal (PDS) and freeze indication signal (FRZ) are at logic level 1, namely, still picture creating apparatus 5 shown in FIG. 5 in the first embodiment executes creation or output of still picture and synchronization of frame synchronizing signal (IFP) and frame pulse is deviated, makes switch 818 into contact point (b), and outputs fixed voltage ($V_{DC}$) to digital/analog converting circuit 816 with the operations of the logic circuits 842, 844, and 846.

Also, gate circuit 804 initializes synchronizing signal generating circuit 822 by making signal (RST) into logic level 1 when freeze indication signal (FRZ) is at logic level 0, signal (PDS) is at logic level 1, and detection frame pulse signal (DFP) is at logic level 1, namely, when still picture creating apparatus 5 shown in FIG. 5 in the first embodiment has not created or output still picture, the synchronization of frame pulse and frame synchronizing signal (IFP) is deviated, and detection frame pulse signal (DFP) is at logic level 1. When synchronizing signal generating circuit 822 is initialized, the phase of line clock pulse and frame synchronizing signal is coordinated to the phase of frame pulse.

Loop filter 814 executes the same operation as loop filter 714 of synchronizing signal generating circuit 70.

Line pulse detecting circuit 812 executes the same operation as line pulse detecting circuit 712 and synchronizing signal generating circuit 70.

Switching circuit 818 selects a numerical value ($V_{DC}$) or outputs signal of loop filter 814 according to the logic level of signal (G) input from gate circuit 804 and outputs it to digital/analog converting circuit 816.

Namely, when logic level 1 is input to switching circuit 818, switching circuit 818 selects the contact point (b) side so numerical value ($V_{DC}$) is input to digital/analog converting circuit 816.

Digital/analog converting circuit 816 converts numerical value ($V_{DC}$) into signal of analog format, outputs it to voltage-controlled oscillator 820, and voltage-controlled oscillator 820 creates clock pulse (HCK) with a frequency corresponding to numerical value ($V_{DC}$).

Namely, when gate circuit 804 outputs signal (G) making it logic level 1, the PLL loop constituted by line pulse detecting circuit 812, loop filter 814, digital/analog converting circuit 816, voltage-controlled oscillator 820, and synchronizing signal generating circuit 822 does not operate and voltage-controlled oscillator 820 simply creates signal (HCK) with a frequency corresponding to numerical value ($V_{DC}$).

On the contrary, if logic level 0 is input to switching circuit 818, switching circuit 818 selects the contact point (a) side so output signals of loop filter 814 are input to digital/analog converting circuit 816.

Namely, when logic level 0 is input to switching circuit 818, switching circuit 818 selects the contact point (a) side so output signals of loop filter 814 are input to digital/analog converting circuit 816, and digital/analog converting circuit 816 converts the value of the output signal of loop filter 814 into signal of analog format and outputs it to voltage-controlled oscillator 820. Namely, voltage-controlled oscillator 820 creates signal (HCK) according to the control of the PLL loop composed by line pulse detecting circuit 812, loop filter 814, digital/analog converting circuit 816, and synchronizing signal generating circuit 822.

Frequency dividing circuits 824, 826, and 828 of synchronizing signal generating circuit 822 respectively execute the same operation as frequency dividing circuits 724, 726, and 728 of synchronizing signal generating circuit 70, and creates clock signal (CK), line clock pulse (HDC), and frame synchronizing signal (IFP). These signals are output to each constitutional elements of MUSE decoder 1 and synchronization detecting circuit 802.

In each circuit of frequency dividing circuits 824, 826, and 828, the count value is initialized when signal (RST) input from gate circuit 804 becomes logic level 1 instructing a reset for the frequency dividing circuit, and clock signal (CK), line clock pulse (HDC), and frame synchronizing signal (IFP) are synchronized to the frame pulse of the MUSE signal.

By the operation in each constitutional element of synchronizing signal generating circuit 80, clock signal (CK), line clock pulse (HDC), and frame synchronizing signal (IFP) synchronized to the frame pulse and line pulse are created.

According to synchronizing signal generating circuit 80 shown in the second embodiment, stable clock signal (CK), frame synchronizing signal (IFP), and line clock pulse (HDC) can be input to each constitutional element of MUSE decoder 1 even when obstacles are generated, such as MUSE signals not being input, etc., which were created in synchronizing signal generating circuit 70 shown in FIG. 6 in the first embodiment.

Consequently, even when the obstacles are created, a poor still picture obtained from still picture creating apparatus 5 is not generated when clock signal (CK), frame synchronizing signal (IFP), and line clock pulse (HDC) are created using synchronizing signal generating circuit 80.

Synchronizing signal generating circuit 80 can be realized despite being able to prevent the poor still picture very effectively compared to synchronizing signal generating circuit 70 shown in the first embodiment. Namely, synchronizing signal generating circuit 80 can be realized simply by adding switching circuit 818 to synchronizing signal generating circuit 70 and adding a number of logic circuits to gate circuit 704 in order to create gate circuit 804.

Synchronizing signal generating circuits 70 and 80 of the present invention can reproduce synchronizing signals from video signals having vertical synchronizing signals corresponding to the frame pulse signals and horizontal synchronizing signals corresponding to the line pulses by suitable modification and is not limited to MUSE signals.

Also, the logic level, etc., of the signals shown in the embodiments are examples and the logic level of the signals can be changed according to suitable modifications.

Also, each constitutional element of synchronizing signal generating circuits 70 and 80 can be replaced with a circuit having the same function or performance or with a software means.

In addition to the embodiments, the synchronizing signal generating circuit of the present invention can be variously constituted as noted here.

As noted above, according to the synchronizing signal generating circuit of the present invention, it is possible to feed stable synchronizing signals to a still picture creating apparatus, etc., for creating still pictures from MUSE signals even when obstacles, such as the termination of MUSE input signals, etc., occur.

Also, according to the synchronizing signal generating circuit of the present invention, disorder in the created still picture is not created even when the obstacles occur.

I claim:

1. A synchronizing signal generating circuit for generating clock signals used in the process of creating still pictures from MUSE signals, comprising:

a phase comparing circuit for comparing the phases of a generated line clock pulse and the line pulse of the MUSE signals;

a filter circuit for filtering the compared results of the phases by the phase comparing circuit;

a switching circuit for selecting the filtering output of the filtering circuit when the process of creating the still pictures is not being executed and selecting and outputting a fixed voltage when the process of creating the still pictures is being executed;

a voltage-controlled oscillator for creating a source clock pulse of a frequency corresponding to the voltage of the output from the switching circuit;

a first frequency dividing circuit for frequency dividing the source clock pulse generated by the voltage-controlled oscillator by counting only a prescribed frequency value and generating the line clock pulse corresponding to the line pulse;

a second frequency dividing circuit for frequency dividing the source clock pulse generated by the voltage-controlled oscillator by only a prescribed cycle and generating a frame clock pulse corresponding to the frame pulse of the MUSE signals; and an initializing circuit for initializing the count value of the first frequency dividing circuit and the second frequency dividing circuit when the phases of the frame clock pulse generated by the second frequency dividing circuit and the frame pulse of the MUSE signals deviate only during the time the process for creating the still pictures is being executed.

2. A still picture creating apparatus for creating still pictures from MUSE signals, comprising:

a control voltage generating circuit for comparing the phases of a generated line clock pulse and the line pulse of the MUSE signals and generating a control voltage by filtering a comparison result in a filtering circuit;

a switching circuit coupled to an output of the control voltage generating circuit, for selecting the filtering output of the filtering circuit when a process of creating the still pictures is not being executed and switching and outputting a fixed voltage when the process of creating the still pictures is being executed;

a frequency dividing circuit coupled to an output of the switching circuit for generating a source clock pulse of a frequency corresponding to the voltage of the output from the switching circuit, which frequency divides by counting the source clock pulse by only a prescribed frequency value and generates a frame clock pulse corresponding to the frame pulse of the MUSE signals and the line clock pulse corresponding to the line pulse;

an initializing circuit coupled to an input of the frequency dividing circuit for initializing the count value of the frequency dividing circuit when the phase of the frame clock pulse generated by the frequency dividing circuit and the frame pulse of the MUSE signals deviate only during the time the process for creating the still pictures is being executed;

a memory circuit which delays input signals by one frame of the MUSE signals;

an interframe interpolating circuit which executes an interframe interpolation process by synchronizing with line pulses and frame pulses and alternately storing the MUSE signals and the MUSE signals output 1 frame before from the memory circuit into the memory circuit; and a picture processing circuit for interfield interpolating by elongating the MUSE signals which were interframe interpolated by the interframe interpolating circuit.

* * * * *

UNITED STATES PATENT AND TRADEMARK OFFICE
CERTIFICATE OF CORRECTION

PATENT NO. : 5,793,437
DATED : August 11, 1998
INVENTOR(S) : Inamori

It is certified that error appears in the above-identified patent and that said Letters Patent is hereby corrected as shown below:

On the title page: Item [56] insert the following:

OTHER DOCUMENTS

|  |  |  |
|---|---|---|
|  |  | Journal of the Electronic Information Communication Society, Yuichi Ninomiya, "MUSE High Vision Transmission System", December 1, 1990, p. 45. |
|  |  | IEEE Tranactions on Broadcasting, Vol. BC-33, No. 4, Yuichi Ninomiya, et al., "An HDTV Broadcasting System Utilizing a Bandwidth Compression Technique" - MUSE, December 1987. pp. 62-92. |

Signed and Sealed this

First Day of June, 1999

Attest:

Q. TODD DICKINSON

Attesting Officer

Acting Commissioner of Patents and Trademarks